US011589501B2

(12) United States Patent
Sauder et al.

(10) Patent No.: US 11,589,501 B2
(45) Date of Patent: Feb. 28, 2023

(54) DOWN-PRESSURE CONTROL FOR AGRICULTURAL TRENCH CLOSING SYSTEMS

(71) Applicant: PRECISION PLANTING LLC, Tremont, IL (US)

(72) Inventors: Derek Sauder, Tremont, IL (US); Jeremy Hodel, Morton, IL (US); Cory Muhlbauer, Bloomington, IL (US)

(73) Assignee: Precision Planting LLC, Tremont, IL (US)

( * ) Notice: Subject to any disclaimer, the term of this patent is extended or adjusted under 35 U.S.C. 154(b) by 882 days.

(21) Appl. No.: 16/528,589

(22) Filed: Jul. 31, 2019

(65) Prior Publication Data

US 2019/0350123 A1 Nov. 21, 2019

Related U.S. Application Data

(63) Continuation of application No. 15/853,692, filed on Dec. 22, 2017, now Pat. No. 10,721,858, which is a
(Continued)

(51) Int. Cl.
*A01C 7/20* (2006.01)
*A01C 5/06* (2006.01)
(Continued)

(52) U.S. Cl.
CPC ............ *A01C 7/205* (2013.01); *A01B 49/027* (2013.01); *A01B 63/008* (2013.01); *A01B 63/32* (2013.01);
(Continued)

(58) Field of Classification Search
CPC ......... A01C 7/203; A01C 7/205; A01C 5/066; A01C 5/068
See application file for complete search history.

(56) References Cited

U.S. PATENT DOCUMENTS 3,157,139 A 11/1964 Spindler
4,009,668 A 3/1977 Brass et al.
(Continued)

FOREIGN PATENT DOCUMENTS

CA 2731590 A1 2/2012
DE 102008045635 A1 5/2009
(Continued)

OTHER PUBLICATIONS

CA Examiner's Report; Application No. 2889032, dated Oct. 7, 2019, 5 pages.
(Continued)

*Primary Examiner* — Alicia Torres

(57) ABSTRACT

An agricultural row unit includes a soil-engaging tool supported from a pivot arm. A sensor generates an output signal relating to an orientation of the pivot arm relative to a frame member. An actuator is configured to applying a down pressure on the soil-engaging tool. A control system in signal communication with the sensor is responsive to the generated output signal to effect a change in applied down pressure on the soil-engaging tool by the actuator. The soil-engaging tool may be a closing wheel or a flap. One or more additional sensors may be provided on gauge wheel arms of the row unit with the control system being responsive to output signals of the additional sensors to effect the change in applied down pressure on the soil-engaging tool by the actuator.

38 Claims, 18 Drawing Sheets

Related U.S. Application Data continuation of application No. 14/437,978, filed as application No. PCT/US2013/066634 on Oct. 24, 2013, now Pat. No. 9,848,524.

(60) Provisional application No. 61/815,540, filed on Apr. 24, 2013, provisional application No. 61/718,087, filed on Oct. 24, 2012.

(51) Int. Cl.
*A01B 49/02* (2006.01)
*A01B 63/00* (2006.01)
*A01B 63/32* (2006.01)

(52) U.S. Cl.
CPC .............. *A01C 5/066* (2013.01); *A01C 5/068* (2013.01); *A01C 7/203* (2013.01)

(56) References Cited

U.S. PATENT DOCUMENTS

| | | | |
|---|---|---|---|
| 4,307,674 A | 12/1981 | Jennings et al. | |
| 4,404,918 A | 9/1983 | Whalen et al. | |
| 4,671,193 A | 6/1987 | States | |
| 4,762,075 A | 8/1988 | Halford | |
| 5,092,255 A | 3/1992 | Long et al. | |
| 5,095,832 A | 3/1992 | Rumbaugh | |
| 5,351,635 A | 10/1994 | Hulicsko | |
| 5,443,023 A | 8/1995 | Carroll | |
| 5,497,717 A | 3/1996 | Martin | |
| 5,645,000 A | 7/1997 | Carroll | |
| 5,666,892 A | 9/1997 | Tortella et al. | |
| 5,676,073 A | 10/1997 | Bergland et al. | |
| 5,906,166 A | 5/1999 | Wagner | |
| 6,253,692 B1 | 7/2001 | Wendling et al. | |
| 6,530,334 B2 | 3/2003 | Hagny | |
| 7,090,433 B2 | 8/2006 | Searby | |
| 7,870,826 B2 * | 1/2011 | Bourgault | A01B 61/00 111/195 |
| 8,522,889 B2 | 9/2013 | Adams et al. | |
| 8,550,020 B2 | 10/2013 | Sauder et al. | |
| 9,107,338 B2 | 8/2015 | Bassett | |
| 9,192,088 B2 | 11/2015 | Bruce | |
| 9,232,687 B2 | 1/2016 | Bassett | |
| 9,743,572 B2 | 8/2017 | Martin | |
| 2003/0084829 A1 | 5/2003 | Lempriere | |
| 2010/0198529 A1 | 8/2010 | Sauder et al. | |
| 2011/0184551 A1 | 7/2011 | Kowalchuk | |
| 2012/0048159 A1* | 3/2012 | Adams | A01C 7/203 111/163 |
| 2012/0060731 A1* | 3/2012 | Bassett | A01B 61/046 172/260.5 |
| 2012/0125244 A1* | 5/2012 | Beaujot | A01B 79/005 111/149 |
| 2012/0232691 A1 | 9/2012 | Green et al. | |
| 2012/0255475 A1 | 10/2012 | Mariman et al. | |
| 2012/0305274 A1 | 12/2012 | Bassett | |
| 2013/0160684 A1 | 6/2013 | Whalen et al. | |
| 2013/0206431 A1 | 8/2013 | Freed | |
| 2013/0248212 A1* | 9/2013 | Bassett | A01B 71/02 172/4 |
| 2014/0026748 A1 | 1/2014 | Stoller et al. | |
| 2014/0224513 A1 | 8/2014 | Van Buskirk et al. | |
| 2015/0264857 A1 | 9/2015 | Achen et al. | |
| 2016/0165788 A1 | 6/2016 | Anderson et al. | |
| 2016/0165789 A1* | 6/2016 | Gervais | A01C 7/205 700/275 |
| 2017/0280618 A1 | 10/2017 | Anderson et al. | |

FOREIGN PATENT DOCUMENTS

| | | |
|---|---|---|
| EP | 0728406 A1 | 8/1996 |
| FR | 376265 A | 8/1907 |

OTHER PUBLICATIONS

Extended European Search Report; EP18161603.8, dated Apr. 13, 2018, 11 pages.

Extended European Search Report; EP13849831.6, daated Jun. 1, 2016, 10 pages.

PCT International Search Report and Written Opinion; PCT/US2013/066634, dated Mar. 21, 2014, 8 pages.

BR Office Action from the Brazilian Patent Office, BR Application No. 112015009089-3, dated Jun. 18, 2019; 8 pages.

\* cited by examiner

DOWN-PRESSURE CONTROL FOR AGRICULTURAL TRENCH CLOSING SYSTEMS

BACKGROUND

In recent years, increased farm operation sizes and time constraints caused by field conditions and weather have increased the need to perform planting operations at faster speeds. However, effectively creating a proper seed environment at high speeds is problematic, particularly in wet or high-residue conditions. "Plugging" of the apparatus used to close the trench is a particular problem, as is failure to return and level the displaced soil into the planting trench. Thus, there is a need for a trench closing system, apparatus and methods providing for more effective closing of the planting trench.

DESCRIPTION

Figure 1:
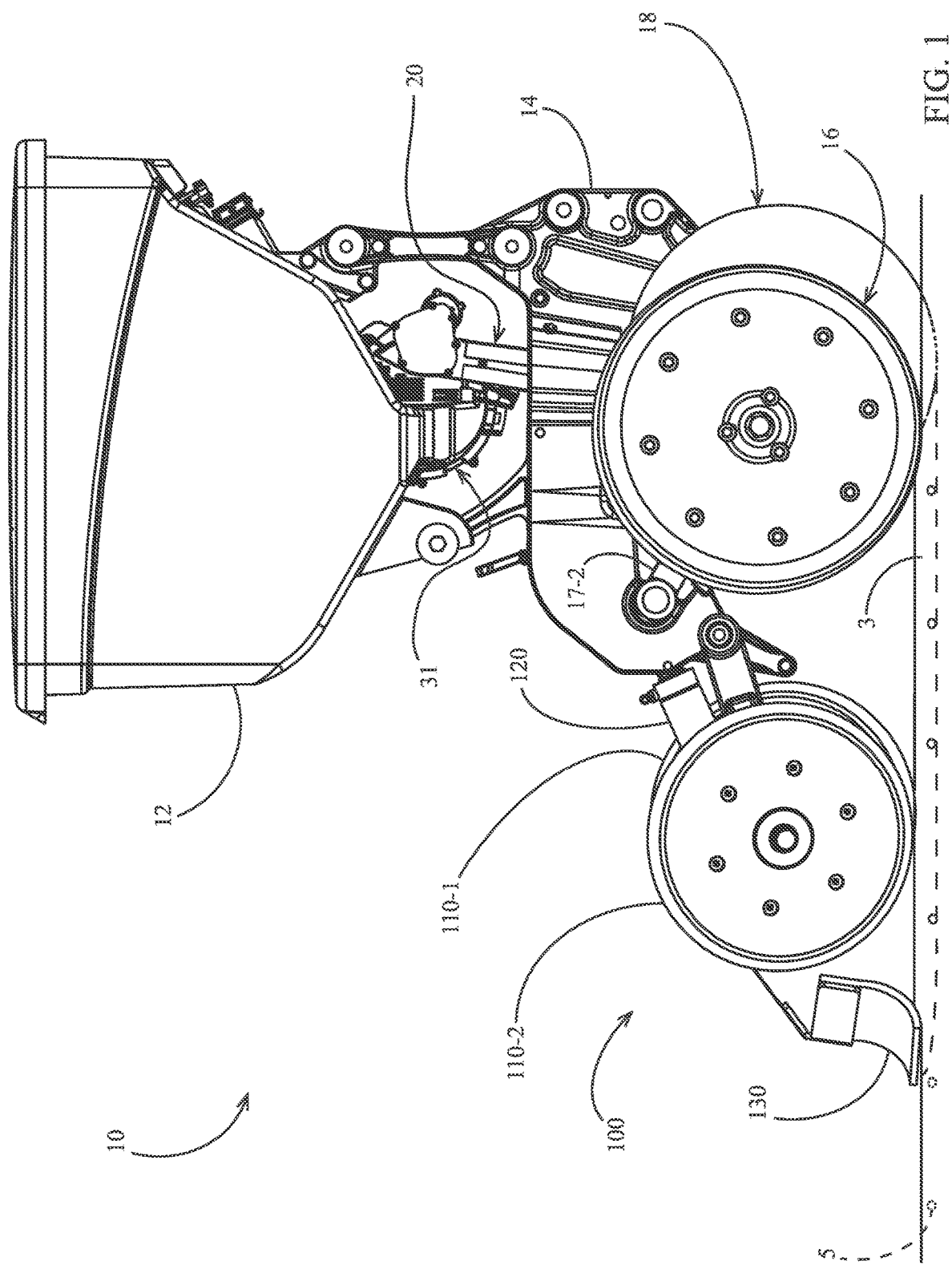
FIG. 1 is a right side elevation view of an embodiment of an agricultural row unit.

Referring to the drawings, wherein like reference numerals designate identical or corresponding parts throughout the several views, FIG. 1 illustrates an agricultural planter, comprising a toolbar (not shown) to which multiple row units 10 are mounted in transversely spaced relation. The row unit 10 preferably comprises one of the row unit embodiments disclosed in applicant's U.S. provisional patent application No. 61/718,051 ("the '051 Application"), the disclosure of which is hereby incorporated herein in its entirety by reference. Each row unit 10 is preferably mounted to the toolbar by a parallel arm arrangement (not shown) such that the row unit is permitted to translate vertically with respect to the toolbar.

The row unit 10 preferably includes a frame 14. The row unit 10 preferably includes an opening disc assembly 18 including two angled discs rollingly mounted to the frame 14 and disposed to open a v-shaped trench 3 in the soil as the row unit traverses a field. The row unit 10 preferably includes a gauge wheel assembly 16 including two gauge wheels pivotally mounted to either side of the frame 14 by respective gauge wheel arms 17 disposed on respective left and right sides of the frame 14. The suffixes "-1" and "-2" are used throughout this description when identifying corresponding left and right components. Accordingly, left and right gauge wheel arms are referred to as 17-1 and 17-2 but only the right gauge wheel arm 17-2 is visible in the right side elevation view of FIG. 1. Those of skill in the art will appreciate that the left side components will be substantially the same as the right side components and therefore need not be shown. The gauge wheels are disposed to roll along the surface of the soil, thus limiting the depth of the trench opened by the opening disc assembly 18. A closing assembly 100 is preferably pivotally coupled to the frame 14 and configured to move displaced soil back into the trench 3 as described in further detail herein.

Continuing to refer to FIG. 1, seeds 5 are communicated from a hopper 12 to a seed meter 30 preferably configured to singulate the supplied seeds. The meter 31 is preferably a vacuum-type meter such as that disclosed in Applicant's co-pending international patent application no. PCT/US2012/030192 (Pub. No. WO/2012/129442), the disclosure of which is hereby incorporated by reference herein in its entirety. In operation, the seed meter 30 preferably deposits the supplied seeds into a seed conveyor 20 such as one of the seed conveyor embodiments disclosed in applicant's co-pending international patent application no. PCT/US2012/57327, the disclosure of which is hereby incorporated by reference herein in its entirety. The seed conveyor 20 is preferably removably mounted to the frame 14 and preferably conveys the seeds 5 deposited by the meter 31 to a lower end of the seed conveyor and deposits the seeds into the trench 3. As disclosed in the '051 Application, in some embodiments the seed conveyor 20 is replaced with a seed tube. In such embodiments, seeds deposited by the meter 31 fall through the seed tube into the trench 3.

Closing Wheel Systems and Apparatus

Figure 2:
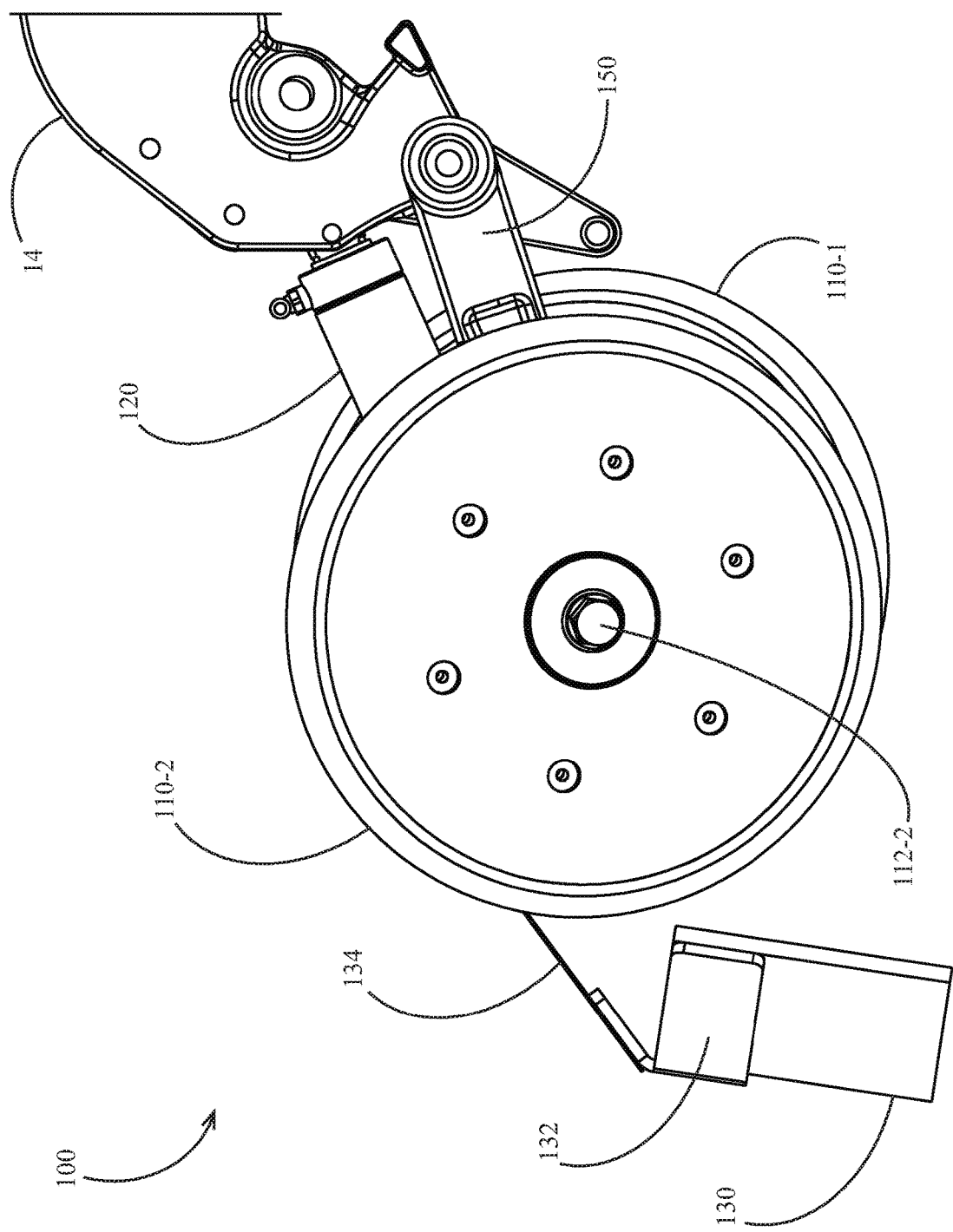
FIG. 2 is a right side elevation of an embodiment of a closing wheel assembly mounted to the row unit of FIG. 1.
Figure 3:
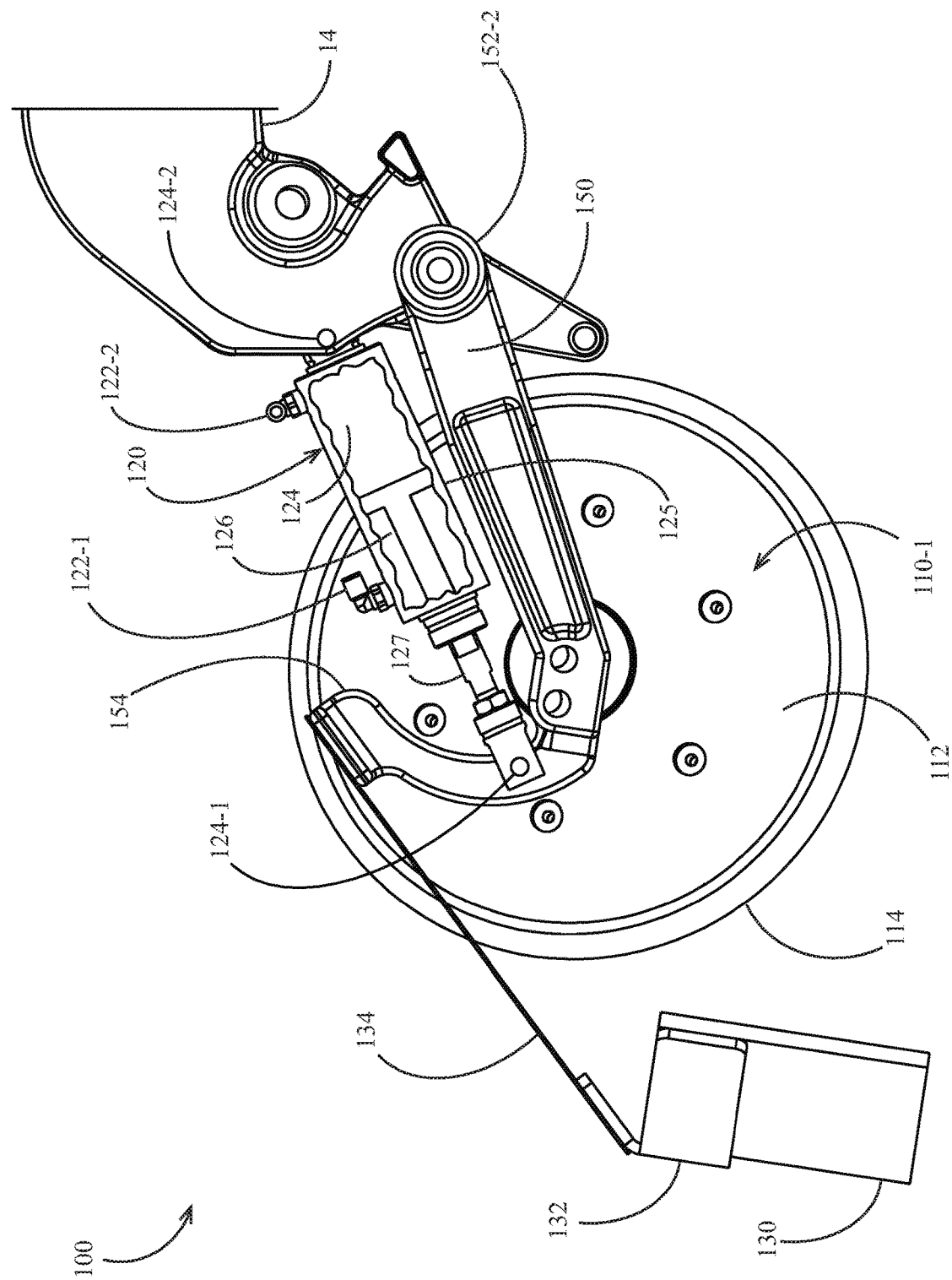
FIG. 3 is a right side elevation view of the closing wheel assembly of FIG. 2 with a right closing wheel not shown for clarity.
Figure 4:
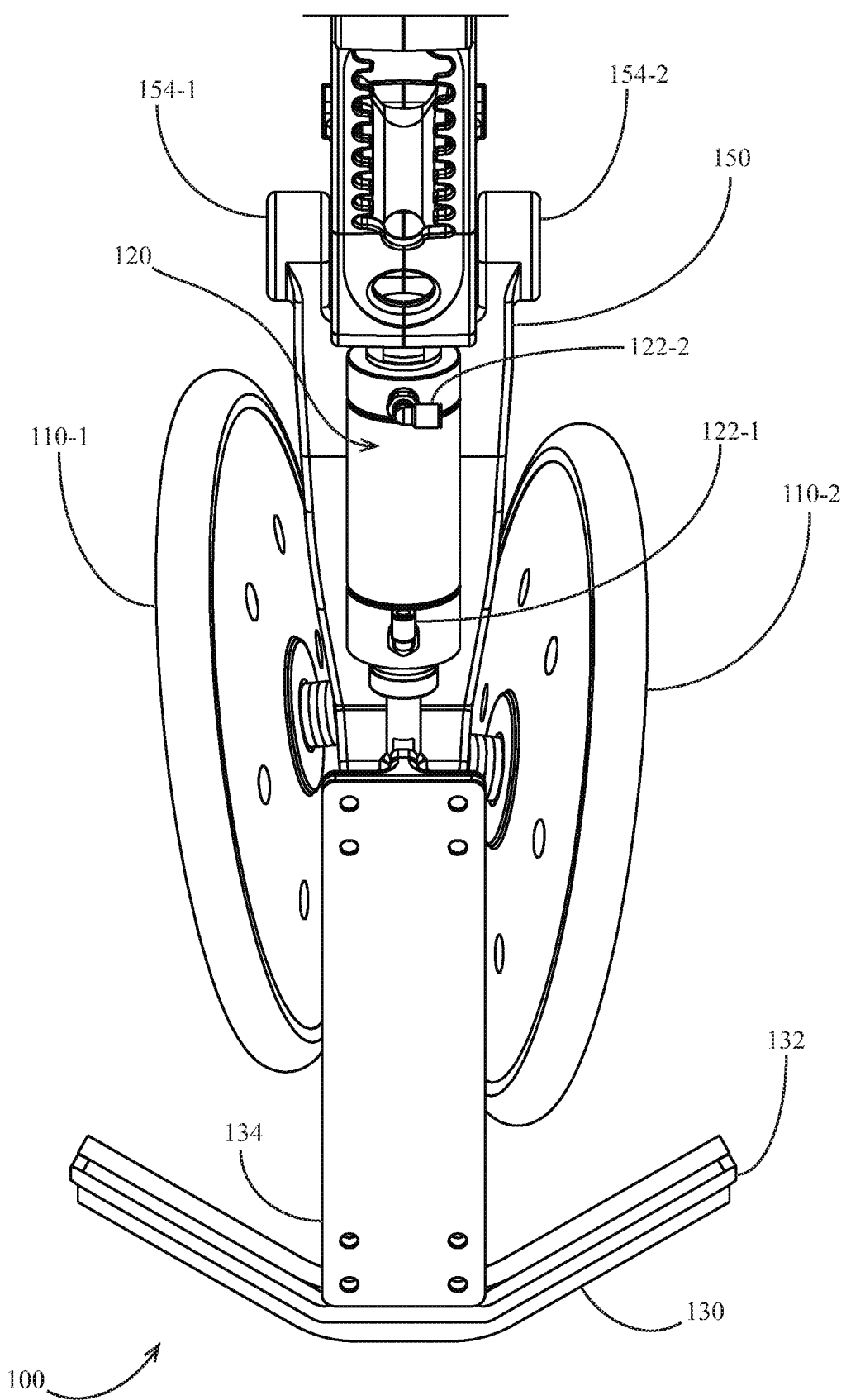
FIG. 4 is a top view of the closing wheel assembly of FIG. 2.
Figure 5:
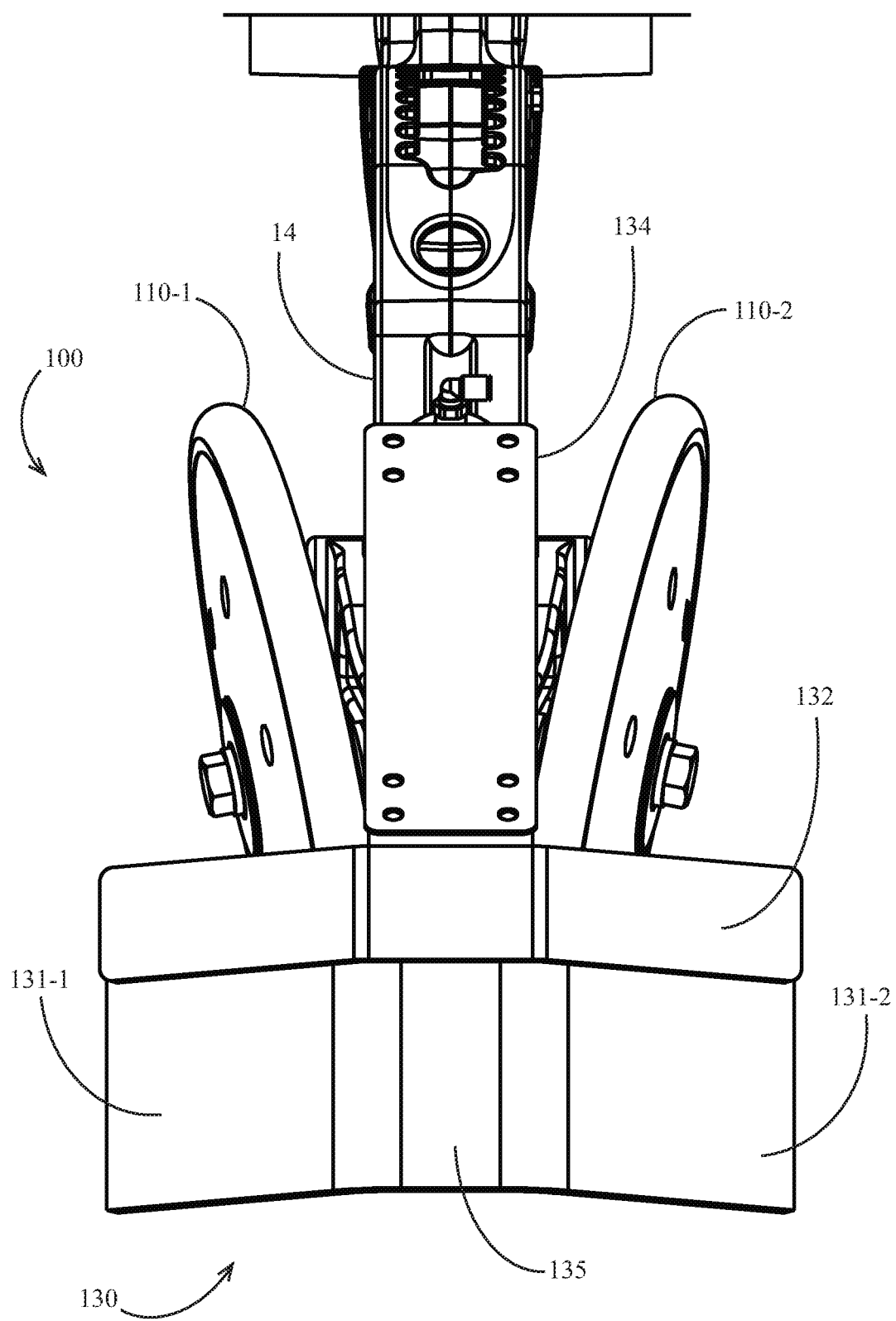
FIG. 5 is a rear view of the closing wheel assembly of FIG. 2.

Turning to FIGS. 2 and 3, the closing assembly 100 preferably includes a left closing wheel 110-1 pivotally mounted to the row unit frame 14 by a pivot arm 150-1. A right closing wheel 110-2 is preferably pivotally mounted to the row unit frame 14 by the pivot arm 150-2. Each closing wheels 110-1, 110-2 is preferably rotatably mounted to the respective pivot arms 150-1, 150-2 by respective pivots 152-1, 152-2. The closing wheels 110-1, 110-2 are disposed to roll along the surface of the soil, with the pivots 152-1, 152-2 extending to the left and right side, respectively, of the row unit frame 14. The pivot arms 150-1 150-2 are preferably pivotally mounted to both sides of the row unit frame 14 by shafts extending through the respective pivots 152-1, 152-2. Referring to FIGS. 4 and 5, the closing wheels 110-1, 110-2 are preferably angled to open upward and forward. In operation, the closing wheels 110-1, 110-2 preferably gather soil previously displaced to the side of the trench 3 by the opening disc assembly 18 and move the displaced soil back into the trench.

Referring to FIG. 3, each closing wheel 110 preferably comprises a hub 112 and a rim 114 circumferentially mounted to the hub 112. The rims 114 are preferably comprised of a wear-resistant material having a relatively high coefficient of friction such as rubber. The hubs 112 are preferably comprised of a relatively lightweight material such as plastic. In other embodiments the hubs 112 are comprised of a relatively heavy material such as cast iron. In still other embodiments, one or both of the closing wheels 110 comprise tined wheels such as those disclosed in U.S. Pat. No. 5,443,023, the disclosure of which is hereby incorporated by reference herein in its entirety.

It should be appreciated that in some applications, the closing wheels 110 do not satisfactorily return displaced soil to the trench 3. Moreover, in some implementations, particularly at operating speeds of 8 to 10 miles per hour, the closing wheels do not satisfactorily firm or level the soil returned to the trench 3. Thus, referring to FIGS. 1 through 3, the closing assembly 100 preferably includes a flap 130 disposed to resiliently contact the surface of the soil behind the closing wheels 110. The flap 130 is preferably resiliently mounted to the pivot arm 150. Specifically, the flap 130 is preferably mounted to a spring 134 by a bracket 132. The spring 134 is preferably mounted at a forward end to an attachment portion 154 of the pivot arm 150.

Figure 6:
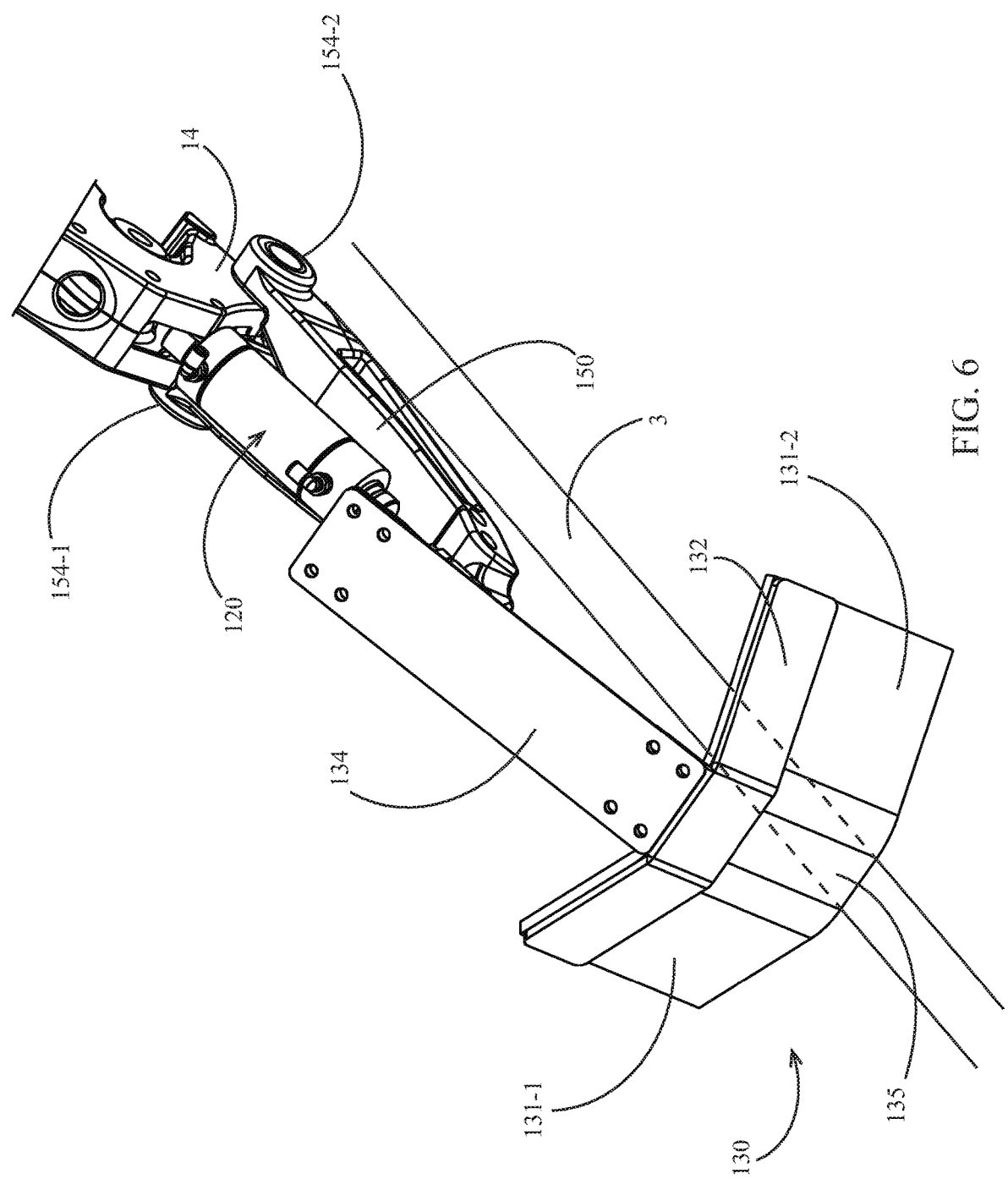
FIG. 6 is a perspective view of the closing wheel assembly of FIG. 2 with the closing wheels removed for clarity.
Figure 7:
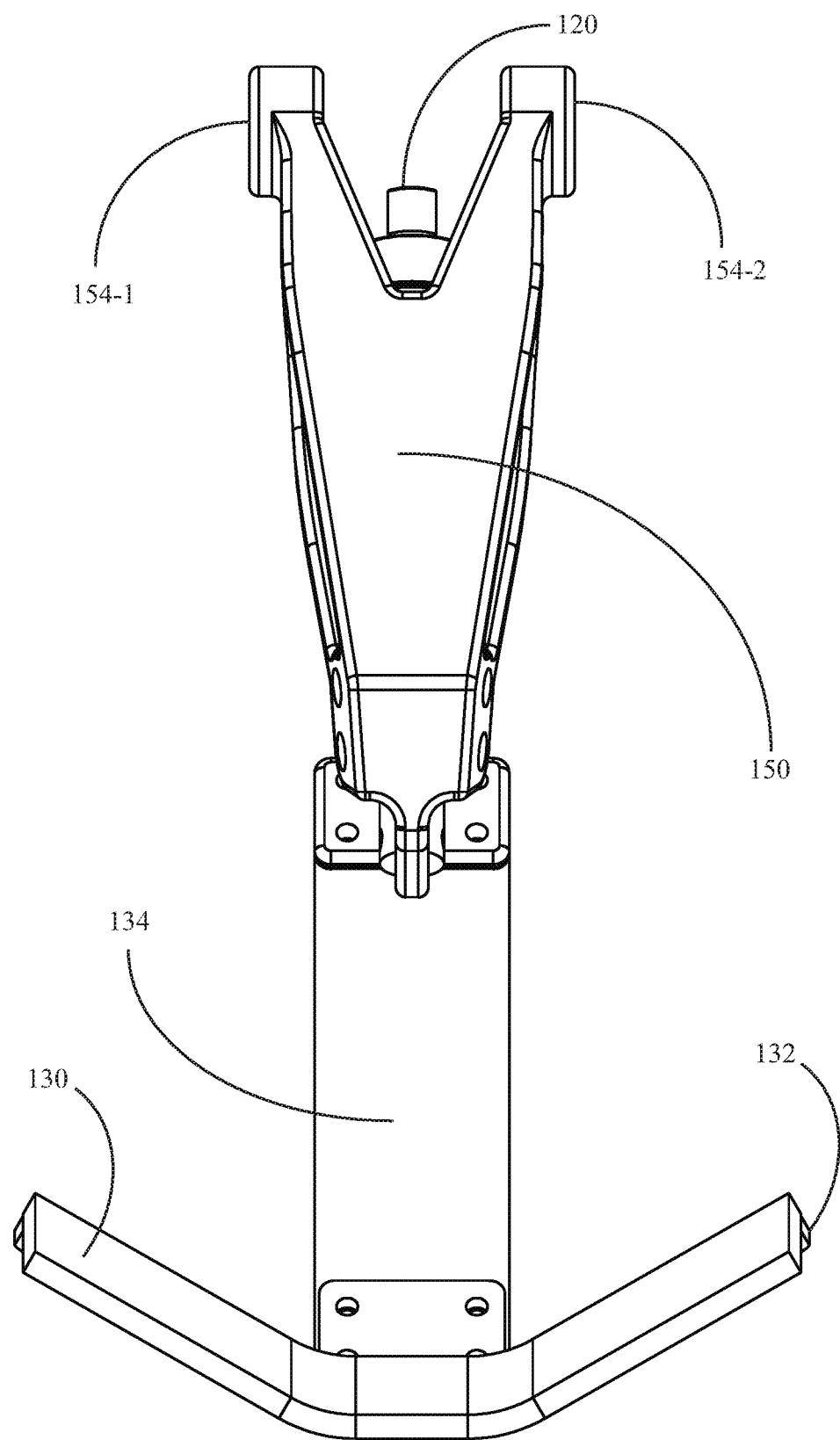
FIG. 7 is a bottom view of a pivot arm of the closing wheel assembly of FIG. 2.
Figure 8:
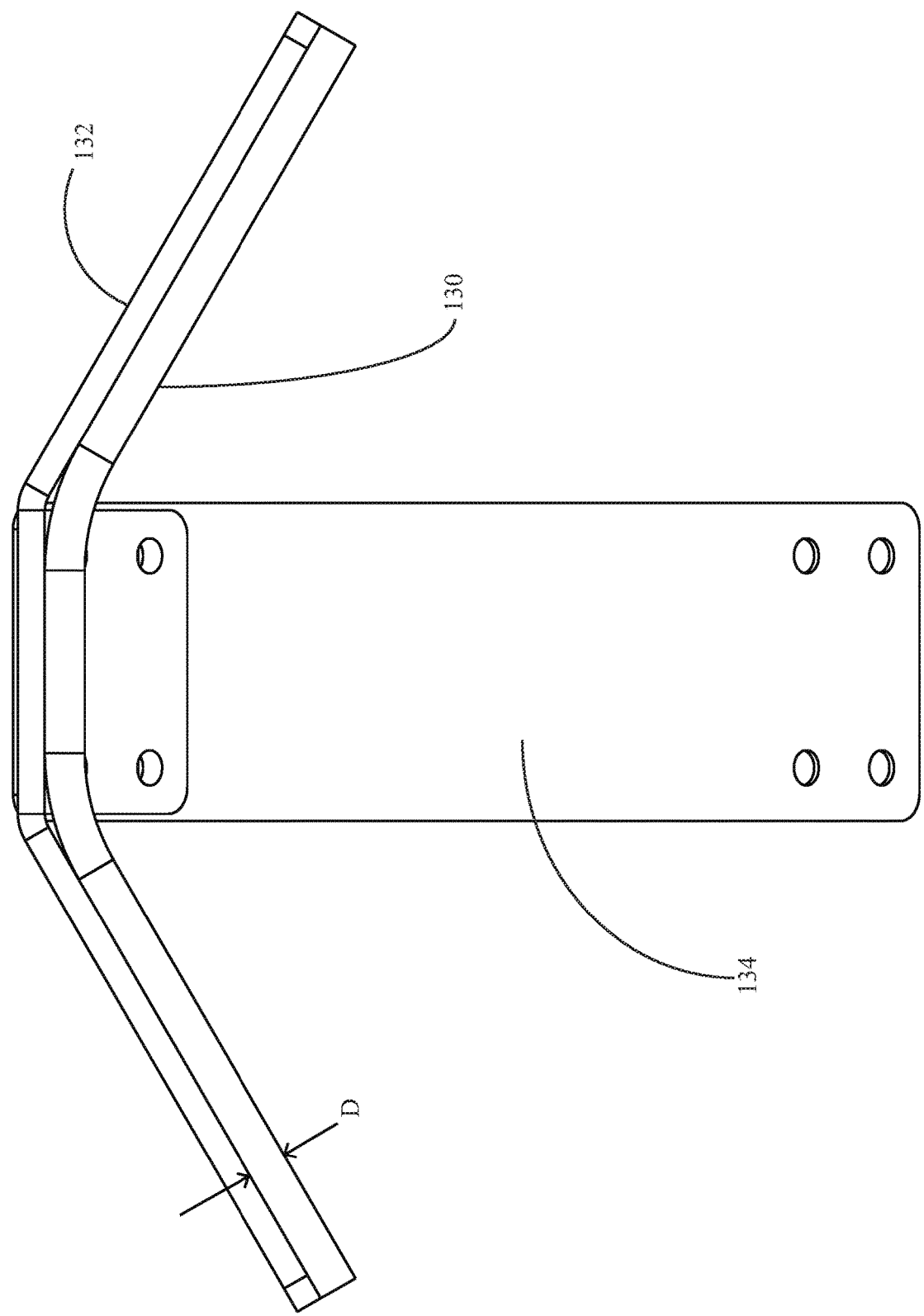
FIG. 8 is a bottom view of a flap of the closing wheel assembly of FIG. 2.

Turning to FIGS. 5 and 6, the flap 130 preferably includes two wings sections 131-1,131-2 extending to the left and right, respectively, of the trench 3. The bracket 132 preferably retains an upper portion of each wing section 131-1, 131-2 in a forward-swept orientation. The flap 130 additionally includes a center section 135 which passes directly over the trench 3 and contacts the trench at a lower end. Turning to FIG. 8, a thickness D of the flap 130 and the stiffness of the flap material is preferably selected to permit resilient engagement of the soil surface without disturbing the soil surface or causing the closing wheels 110 to ride off the ground. The flap 130 is preferably made of a relatively flexible material such as rubber. The flap 130 is preferably made of neoprene. The thickness D of the flap 130 is preferably approximately ⅜ inch.

In operation, as the row unit 10 traverses the field, the flap 130 is preferably elastically deformed as it resiliently contacts the surface of the soil as best illustrated in FIG. 1. As the forward-swept wing sections 131 pass over the soil displaced to the side of the trench, the wings move soil displaced by the opening disc assembly 18 (and not returned to the trench 3 by the closing wheels 110) into the trench. Further, the center section 135 resiliently contacts and firms the replaced soil in the trench 3.

Turning to FIG. 3, the closing assembly 100 preferably includes an actuator 120 disposed to modify the forces between the closing wheels 110 and the soil surface, as well as between the flap 130 and the soil surface. The actuator 120 preferably comprises a pneumatic actuator such as the pneumatic actuator embodiments disclosed in Applicant's co-pending U.S. patent application Ser. No. 12/970,708 ("the '708 application"), the disclosure of which is hereby incorporated herein in its entirety by reference. In other embodiments, the actuator comprises an airbag or a pair of counter-acting airbags. In still other embodiments, the actuator 120 comprises a hydraulic actuator.

The actuator 120 is preferably pivotally mounted at a first end to the row unit frame 14 by a shaft 124-2. The actuator 120 is preferably pivotally mounted at a second end to a rearward portion of the pivot arm 150 by a shaft 124-1. The actuator 120 includes a cylinder 125 and a rod 127. The rod 127 divides an interior volume of the cylinder 125 into a lift chamber 126 and a down chamber 124. An inlet 122-2 is in fluid communication with the down chamber 124. An inlet 122-1 is in fluid communication with the lift chamber 126.

In operation, as fluid pressure in the down chamber 124 is increased relative to the fluid pressure in the lift chamber 126, a load is transferred from the frame 14 to the closing assembly 100 such that the force imposed on the soil by the closing wheels 110 and the flap 130 increases. Likewise, as fluid pressure in the down chamber 124 is decreased relative to the fluid pressure in the lift chamber 126, the force imposed on the soil by the closing wheels 110 and the flap 130 decreases.

In the closing assembly embodiment of FIGS. 1-8, it should be appreciated that the amount of force transmitted from the actuator 120 to the flap 130 is related to the effective stiffness, i.e., the spring constant, of the spring 134. In an alternative closing assembly 800 illustrated in FIGS. 10A and 10B, the flap 130 is resiliently held in contact with the soil surface by an adjustably retained spring, enabling the user to adjust the amount of force transmitted to the flap 130.

Figure 10A:
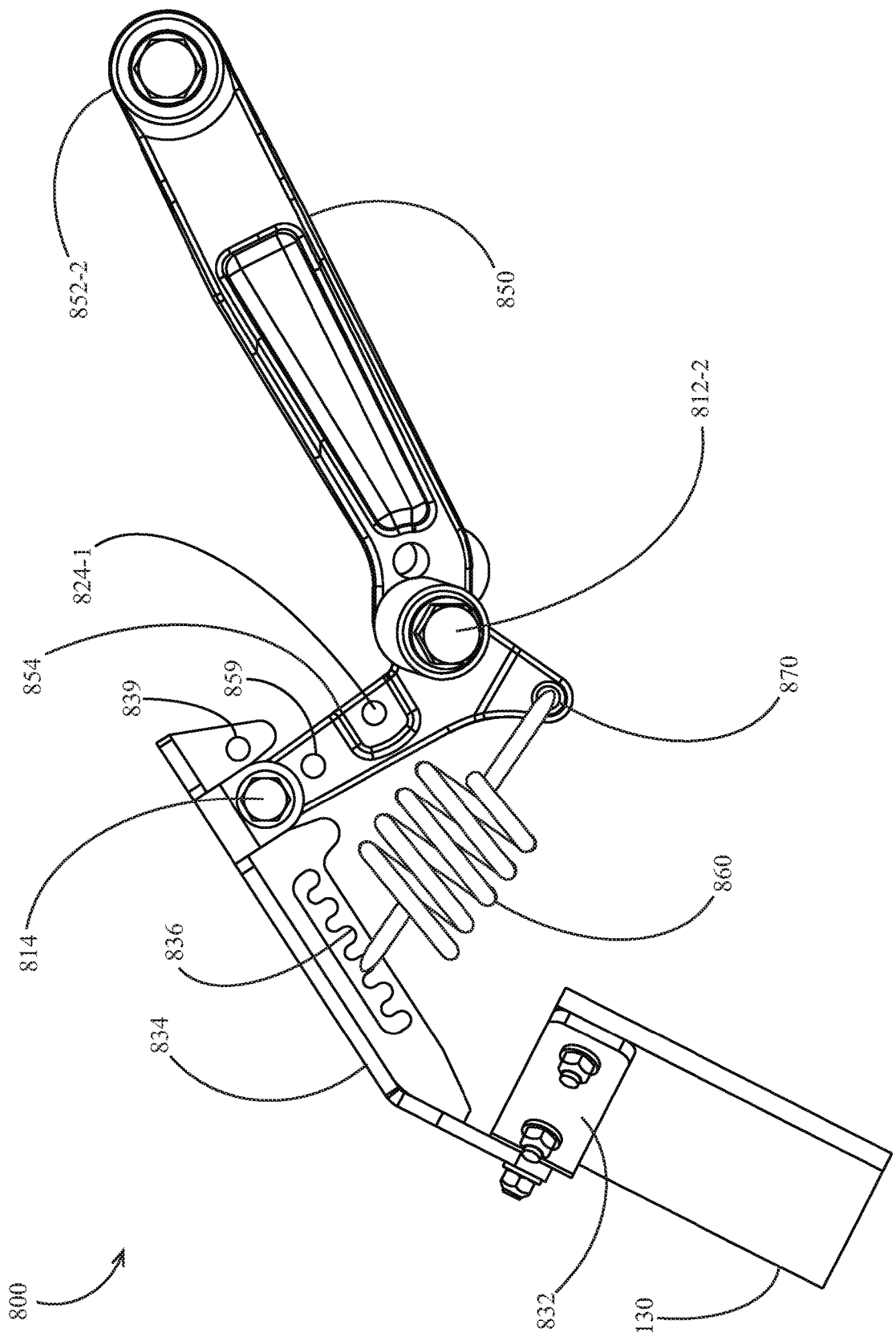
FIG. 10A is a right side elevation view of another embodiment of a closing wheel assembly.
Figure 10B:
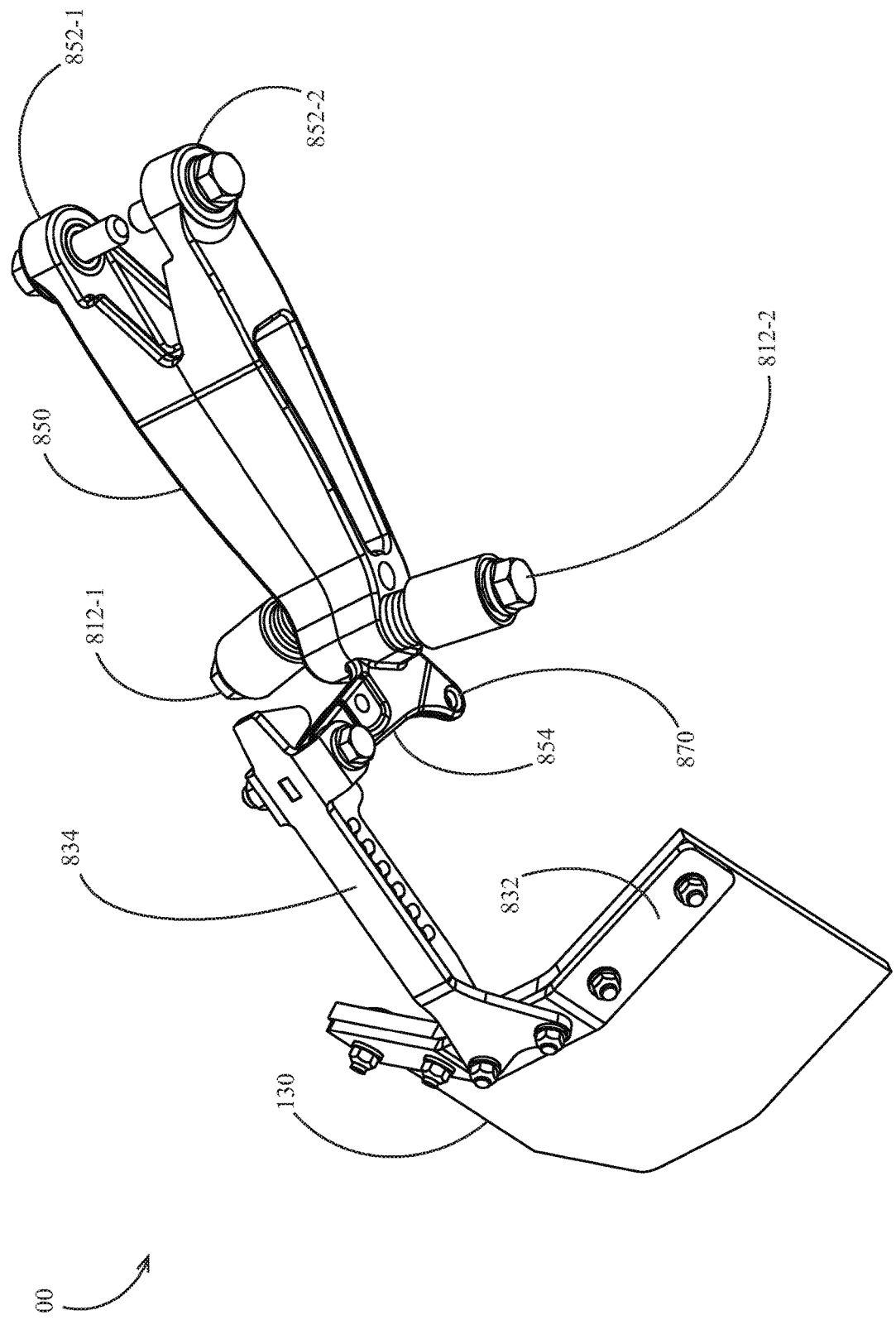
FIG. 10B is a perspective view of the closing wheel assembly of FIG. 10A.

Referring to FIG. 10A, a pivot arm 850 of the closing assembly 800 is pivotally mounted to the row unit frame 14 at pivots 852. Closing wheels 110 are rollingly mounted to the pivot arm 850 at shafts 812. The pivot arm 850 includes a rearward portion 854 to which an actuator 120 is pivotally mounted at an aperture 824-1 in the rearward portion 854 of the pivot arm 850. As with the closing assembly 100, the actuator is also pivotally mounted to the row unit frame 14. The rearward portion 854 is preferably rigidly mounted to the pivot arm 850, e.g., by welding, and in other embodiments is formed as a part of the pivot arm.

A rigid link 834 is preferably pivotally mounted to the rearward portion 854 of the pivot arm 850 at a pivot 814. The rigid link 834 preferably includes a force adjustment slot 836 having multiple notches along the length of the slot. A tension spring 860 is preferably retained at a first end by the force adjustment slot 836. The tension spring 860 is preferably retained at a second end by an attachment aperture 870 formed in the rearward portion 854 of the pivot arm 850. The user adjusts the tension in spring 860 (and thus the force transmitted from the pivot arm 850 to the flap 130) by selecting the notch in which the first end of the spring 860 is retained. The flap 130 is preferably mounted to the rigid link 834 by a mounting bracket 832 which, as with the mounting bracket 132, preferably retains the wing sections 131 of the flap in a forward-swept orientation.

Referring to FIG. 10A, in a preferred embodiment the closing assembly 800 includes lock-up features enabling the operator to lock the flap 130 in a raised position such that the flap does not contact the soil in operation while the remainder of the closing assembly 800 remains in an operative, ground-engaging state. The user preferably locks the flap 130 in the raised position by first adjusting the spring 860 to the notch farthest to the right on the view of FIG. 10 in order to loosen the spring. The user then rotates the link 834 upward (clockwise on the view of FIG. 10A) until a transverse hole 839 formed in the rigid link 834 is aligned with a transverse hole 859 formed in the rearward portion 854 of the pivot arm 850. The holes 859, 854 are preferably equidistant from a central axis of the pivot 814 and are preferably equal in diameter. The user then inserts a pin through both the holes 839, 859 in order to lock the link 834 (and thus the flap 130) in the raised position. It should be appreciated that other mechanisms could be used to lock up the other closing wheel assembly embodiments disclosed herein.

Closing Wheel Downforce Control Systems

Figure 9A:
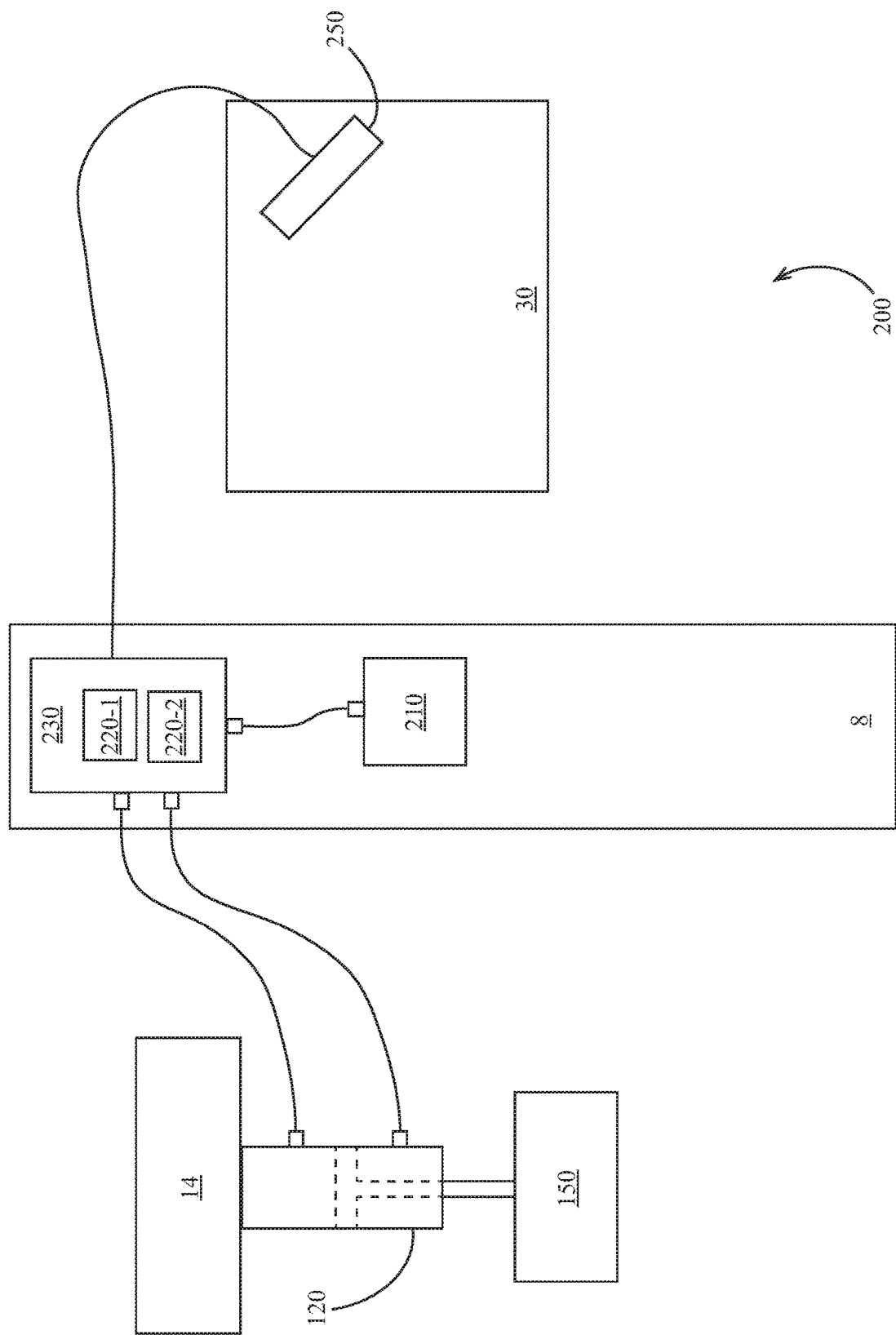
FIG. 9A schematically illustrates an embodiment of a closing wheel control system.

Turning to FIG. 9A, a control system 200 is illustrated for controlling the net force applied by the actuator 120 to the closing system embodiments described herein. The control system 200 preferably includes a fluid control system 230 having a first solenoid valve 220-1 in fluid communication with the down chamber 124 and a second solenoid valve 220-2 in fluid communication with the down chamber 124. Each solenoid valve 220 in the control system 200 is in fluid communication with an air compressor 210 preferably mounted to a toolbar 8 of the planter and configured to supply pressurized air to the fluid control system 230. A controller 250 having a processor, memory, and graphical user interface is preferably in electrical communication with the fluid control system and configured to set a pressure in the chambers 124,126 of the actuator 120. The controller 250 is preferably mounted in a cab of a tractor 30. In operation, the user inputs a desired net pressure (e.g., the pressure in the down chamber 124 less the lift chamber 126) into the controller 250 and the controller communicates a signal to the solenoid valve 220-1 and/or the solenoid valve 220-2 in order to achieve the desired net pressure in the actuator 120. Each solenoid valve 220 is preferably a pressure control (e.g., pressure reducing-relieving) valve configured to establish and maintain a selected pressure at a control outlet of the valve corresponding to a command signal received by the solenoid valve.

Figure 9B:
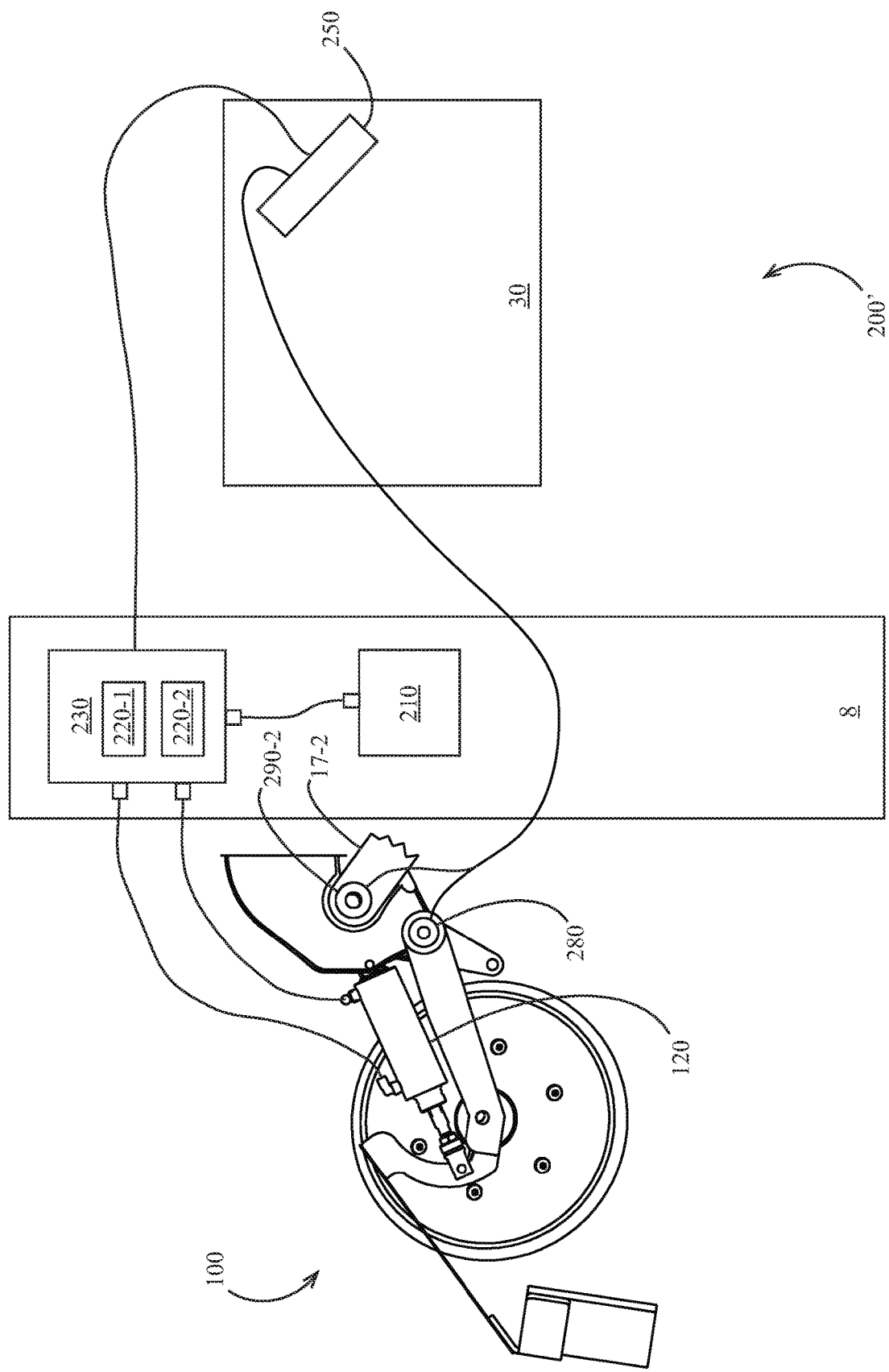
FIG. 9B schematically illustrates another embodiment of a closing wheel control system.

Turning to FIG. 9B, modified control system 200' is illustrated further including a pivot arm angle sensor 280 mounted to the closing wheel assembly 100 and in electrical communication with the controller 250. The angle sensor 280 preferably comprises a rotary potentiometer configured to generate a signal related to the orientation of the pivot arm 150 relative to the row unit frame 14. In operation, the controller 250 determines a desired force adjustment in the actuator 120 based on the output of the angle sensor 280.

Some embodiments of the control system 200' further include two gauge wheel arm angle sensors 290, one mounted to each gauge wheel arm 17 of the gauge wheel assembly 16, in electrical communication with the controller 250. The angle sensor 290 preferably comprises a rotary potentiometer configured to generate a signal related to the orientation of the associated gauge wheel arm 17 relative to the row unit frame 14. In operation, the controller 250 determines a desired force adjustment in the actuator 120 based on a summed signal equal to the difference between the signal generated by the sensor 280 and the average of the signals generated by the sensors 290-1,290-2. In some methods, the controller 250 increases the net pressure (e.g., by increasing the pressure in the down chamber 124) when the summed signal exceeds a threshold, i.e., the closing wheels 110 have rotated upward past one or more threshold angles relative to the gauge wheels of the gauge wheel assembly 16. The threshold angle is preferably exceeded when the bottom of the closing wheels 110 raises higher than a vertical plane representing the average height of the bottom of the gauge wheels 17-1,17-2.

Figure 15:
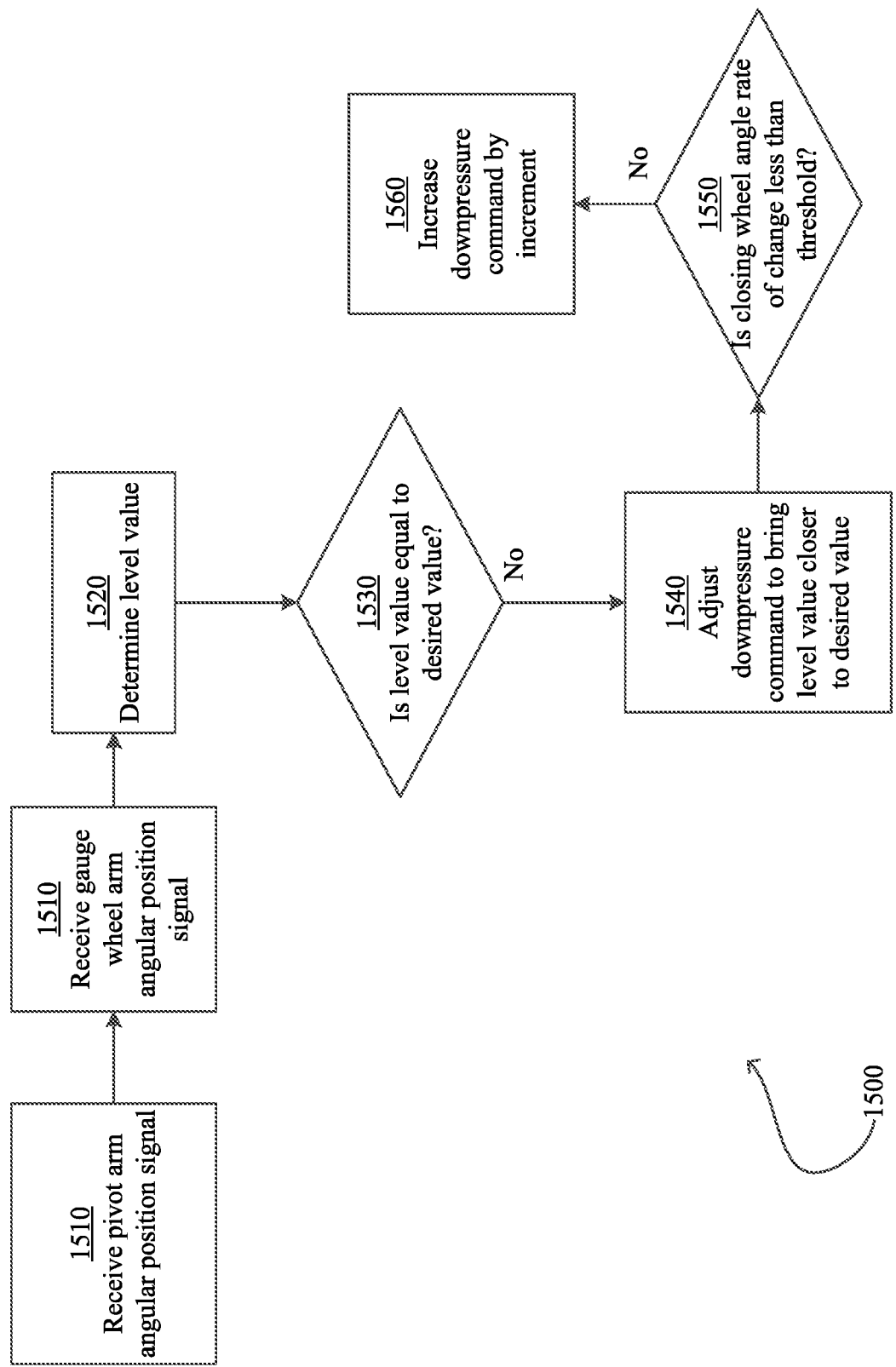
FIG. 15 illustrates an embodiment of a process for controlling downpressure on a closing wheel assembly.

Referring to FIG. 15, a process 1500 for controlling downpressure on the closing wheel assembly based on input from the angle sensor 280 and/or angle sensors 290 is illustrated. At step 1510 the controller 250 preferably receives a signal from the angle sensor 280. In some embodiments, at step 1515 the controller 250 additionally receives a signal from the angle sensors 290. At step 1520 the controller 250 determines a level value based on the signal generated by the angle sensor 280 and/or the signal generated by angle sensors 290. In some embodiments the level value is equal to the sum of the closing wheel angle sensor signal and the average of the gauge wheel angle sensor signals. At step 1530 the level value is compared to a desired value stored in memory. For example, a desired value corresponding to the bottom of the closing wheels being level with the bottom of the gauge wheels. If at step 1530 the controller determines that the level value is not equal to or within a threshold range (e.g., plus or minus 5%) of the desired value, then at step 1540 the controller preferably adjusts a downpressure command (e.g., the control pressure of one of the solenoid valves) to the fluid control system 230 to bring the measured depth closer to the desired value. For example, the controller 250 preferably reduces the net pressure in the actuator (e.g., by decreasing the pressure in the down chamber 124) when the signal corresponds to a position in which the pivot arm 150 has rotated downward past a threshold angle relative to the gauge wheel arms, indicating that the soil is too soft for the current pressure setting. At step 1550 the controller 250 optionally determines whether the rate of change of the signal generated closing wheel angle sensor 280 is within a threshold range. If the rate of change of the signal is not within the threshold range, then at step 1560 the controller 250 preferably increases the downpressure command by an increment (e.g., 1 psi).

Figure 9C:
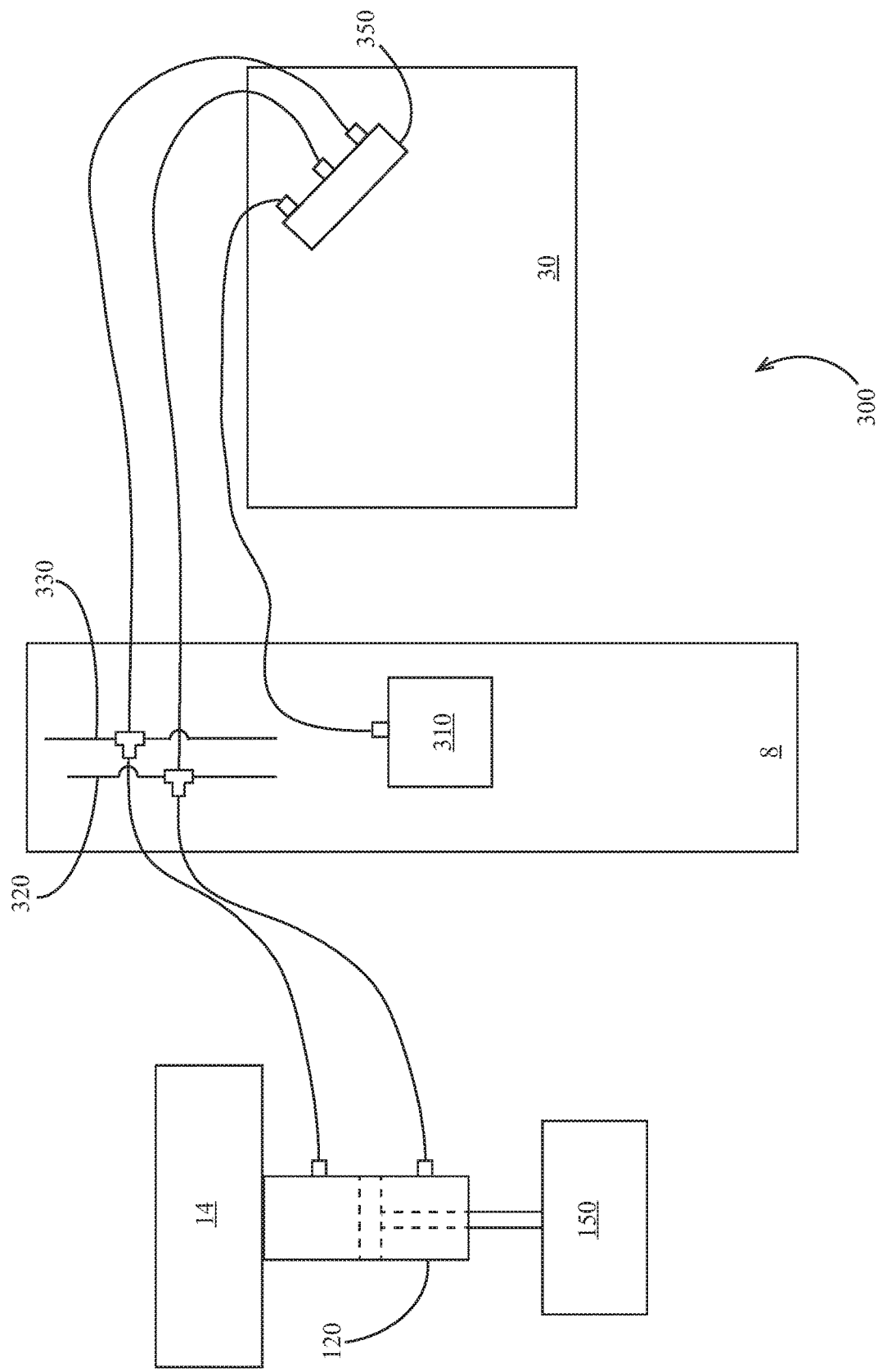
FIG. 9C schematically illustrates still another embodiment of a closing wheel control system.

Turning to FIG. 9C, another control system 300 is illustrated for controlling the pressure in one or more actuators 120 associated with one or more row units 10 mounted along the toolbar 8. A pneumatic controller 350 similar to those controllers disclosed in the '708 application (previously incorporated herein by reference) is in fluid communication with an air compressor 310, a lift supply line 320, and a down supply line 330. The lift supply line 320 is in fluid communication with each lift chamber 126 and the down supply line 330 is in fluid communication with each lift chamber 124. In operation, the user adjusts the controller 350 to set a desired net pressure in the actuator 120.

Tandem Wheel Embodiments

Figure 11:
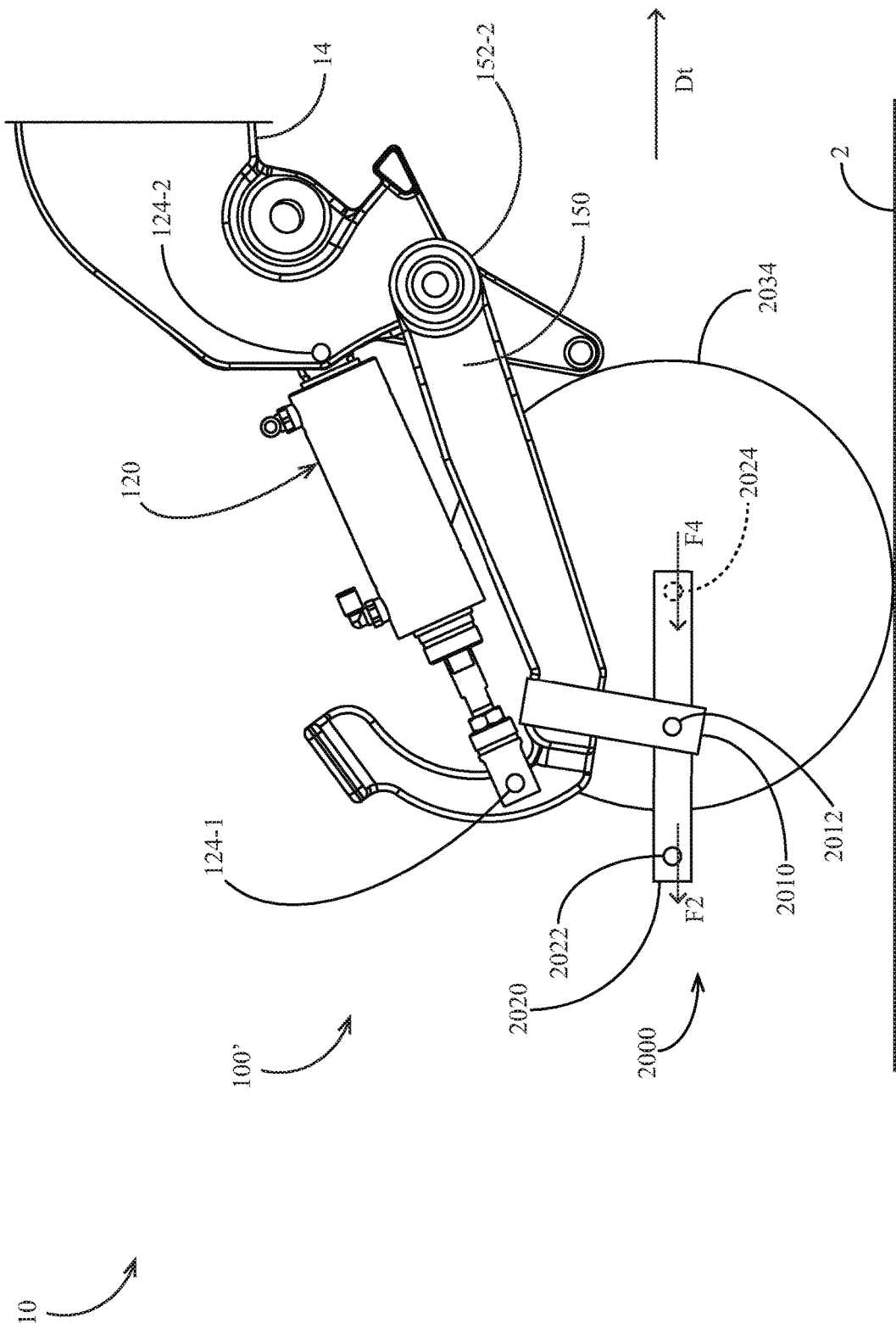
FIG. 11 is a right side elevation view of an embodiment of a closing assembly including an embodiment of a closing wheel with a right closing wheel not shown for clarity.
Figure 12:
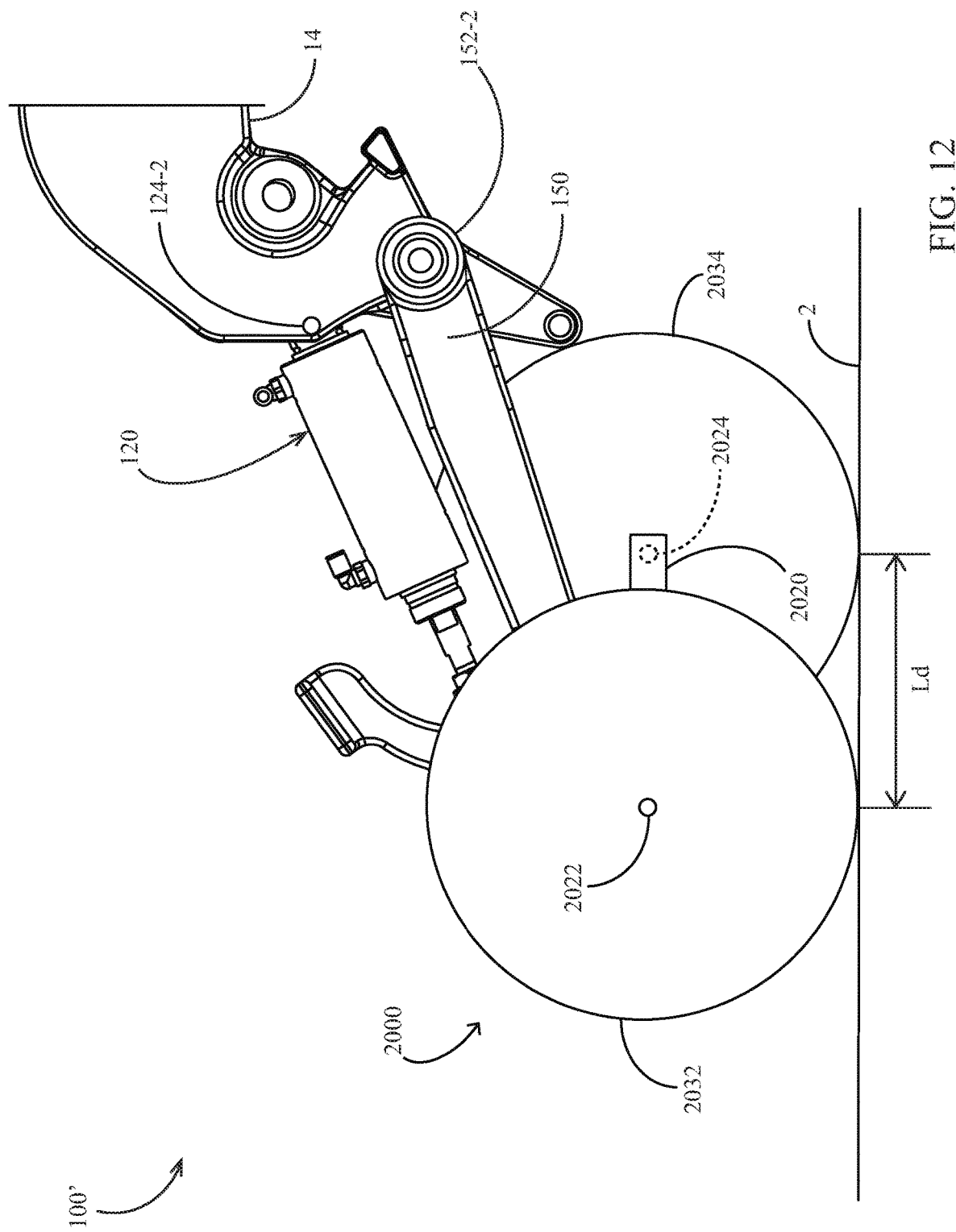
FIG. 12 is a right side elevation view of the closing assembly of FIG. 11 with the right closing wheel shown.
Figure 13:
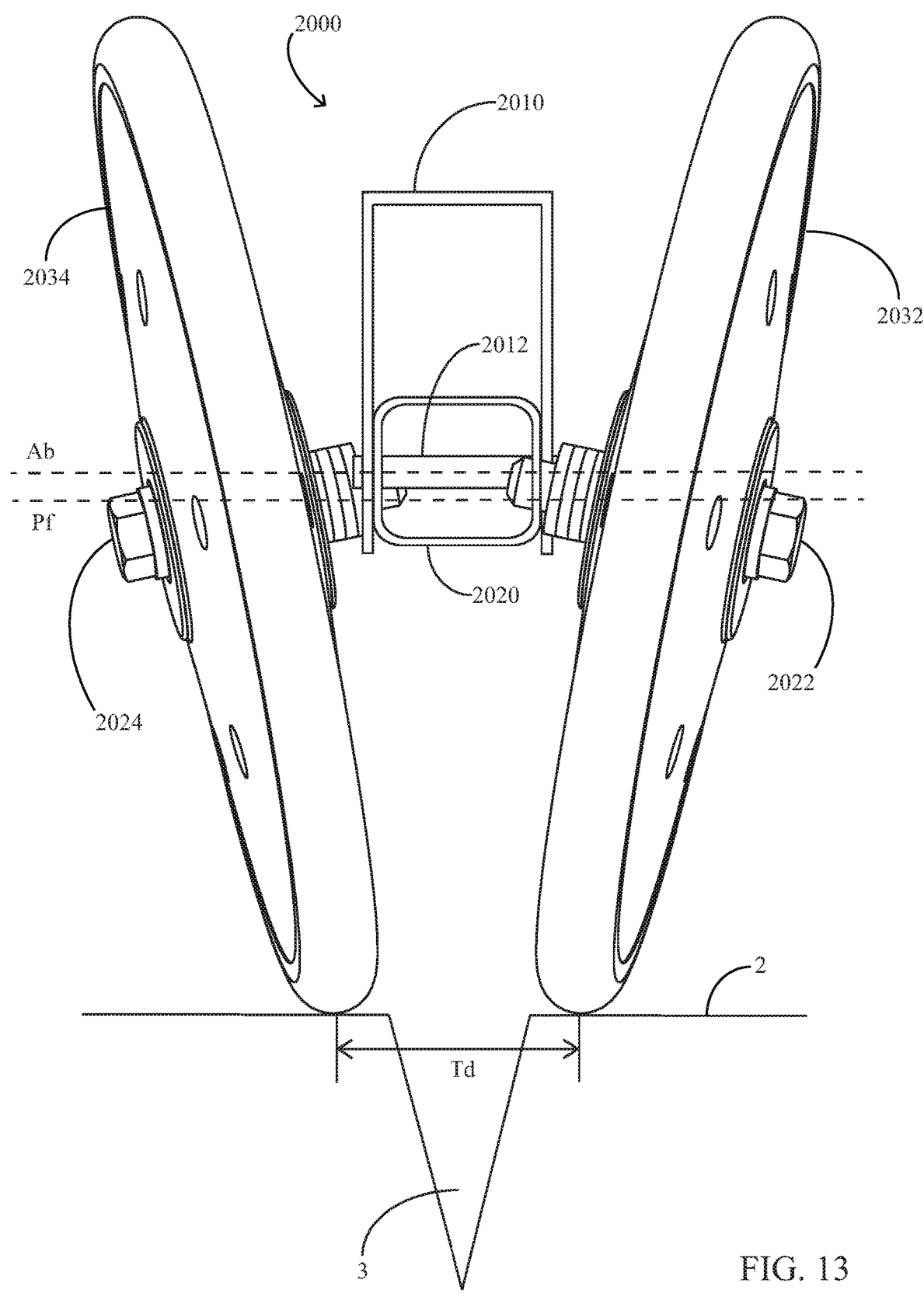
FIG. 13 is a rear elevation view of the closing assembly of FIG. 11 with certain components not shown for clarity.

FIGS. 11-13 illustrate an embodiment of a closing assembly 100' of a row unit 10. The closing assembly 100' is preferably pivotally coupled to the row unit frame 14 as disclosed previously herein and configured to move displaced soil back into the trench 3 as described in further detail herein.

Similar to the closing assembly 100 described in previously herein, the closing assembly 100' includes a pivot arm 150 preferably pivotally mounted to both sides of the row unit frame 14 by shafts extending through pivots 152 of the pivot arm. An actuator 120 is preferably pivotally mounted at a first end to the row unit frame 14 by a shaft 124-2. The actuator 120 is preferably pivotally mounted at a second end to a rearward portion of the pivot arm 150 by a shaft 124-1. The actuator 120 may be any actuator configured to apply a variable force to the pivot arm, such as a pneumatic or hydraulic actuator.

The closing assembly 100' also preferably includes a closing wheel assembly 2000. The closing wheel assembly 2000 preferably includes a bracket 2010. The bracket 2010 is preferably rigidly mounted at an upper end to a rearward end of the pivot arm 150. A walking arm 2020 is preferably pivotally mounted to a lower portion of the bracket 2010 by a bushing 2012 extending through the bracket 2010 and the walking arm 2020.

The closing wheel assembly 2000 also preferably includes a rear closing wheel 2032 and a forward closing wheel 2034. The forward closing wheel 2034 is preferably rollingly mounted to a forward end of the walking arm 2020 about a forward axis 2024. The rear closing wheel 2032 is preferably rollingly mounted to a rearward end of the walking arm 2020 about a rear axis 2022. As best illustrated in FIG. 13, the rear axis 2022 and the forward axis 2024 preferably descend as they extend in an outboard direction such that the closing wheels 2032, 2034 open upward. Additionally, the rear axis 2022 and the forward axis 2024 preferably extend rearwardly as they extend in an outboard direction such that the closing wheels 2032, 2034 open forward. It should be appreciated that the orientation of the closing wheels with respect to the direction of travel Dt assists in moving soil displaced from the trench 3 back into the trench. In some embodiments, each of the closing wheels 2032, 2034 include a soil disrupting feature or features (e.g., tines or blades) disposed around the perimeter of the disc. However, the illustrated closing wheels instead have a substantially constant radius.

As illustrated in FIG. 13, the points of contact between the closing wheels 2032, 2034 and the soil are preferably separated by a transverse distance Td. The transverse distance Td is preferably slightly wider than an upper end of the trench 3 such that the closing wheels 2032, 2034 are disposed to return soil displaced from the trench back into the trench. The transverse distance Td is thus preferably slightly wider (e.g., 0.25 to 1 inch wider) than the separation between the opening discs of the opening disc assembly 18 at the height at which the opening discs emerge from the soil (e.g., at 1.75 inches from the bottom of the opening discs). The transverse distance Td is preferably variable by addition or removal of shims as is known in the art.

As illustrated in FIG. 12, the axes 2022, 2024 are separated by a longitudinal (i.e., travel-direction) distance Ld such that the points of contact between the closing wheels and the soil surface 2 are also separated by the same longitudinal distance Ld when the walking arm 2020 is oriented horizontally. The distance Ld is preferably between 2 inches and 8 inches and is preferably approximately 7 inches. Particularly in embodiments in which the perimeter of each closing wheel is configured to consistently maintain contact with the soil (e.g., both closing wheels 2032, 2034 illustrated in FIG. 13), and even more particularly in embodiments in which the transverse distance Td between the closing wheels is sized such that the closing wheels are positioned adjacent to either side of the trench, a small or near-zero longitudinal distance Ld distance between the closing wheels results in "pinching" or "plugging" of soil between the closing wheels.

In operation, as the row unit 10 encounters changes in terrain, the closing wheels 2032, 2034 pivot relative to one another about the bushing 2012. Thus upon encountering a soil surface sloped along the travel direction Dt or transverse to the travel direction, the closing wheels 2032, 2034 maintain simultaneous contact with the soil surface despite the preferably substantial longitudinal distance Ld between the points of contact between closing wheels 2032, 2034 and the soil.

Figure 14:
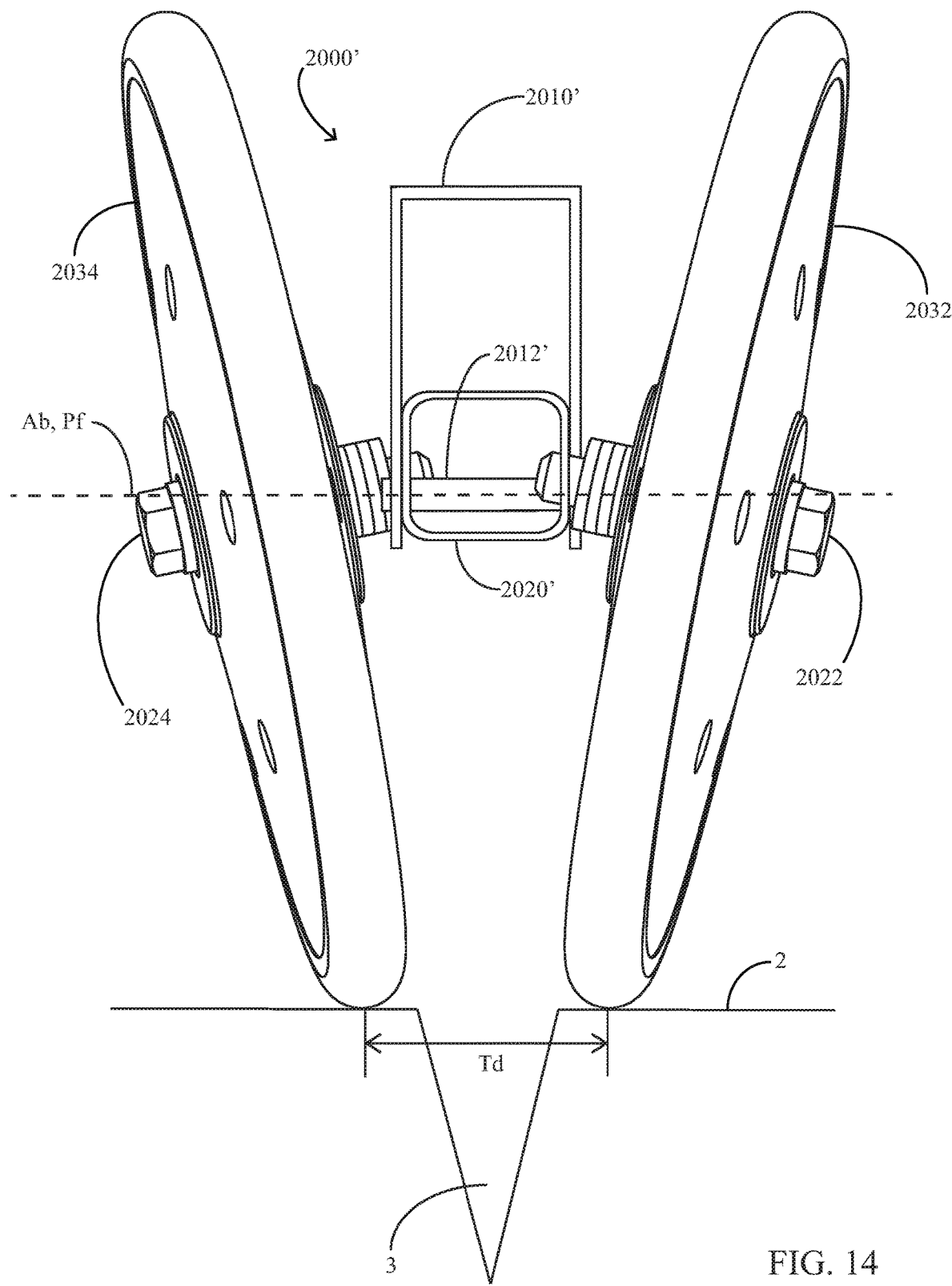
FIG. 14 is a rear elevation view of another embodiment of a closing wheel assembly with certain components not shown for clarity.

In operation as the row unit 10 traverses the field, the soil surface 2 imposes a rearward horizontal force on the rear closing wheel 2032 resulting in a rearward horizontal force F2 on the rear axle 2022 (FIG. 11). The soil surface imposes a rearward horizontal force on the forward closing wheel 2034 resulting in a rearward horizontal force F4 on the forward axle 2024. As illustrated in FIG. 13, the forces F2, F4 preferably act along a common plane Pf. In a another embodiment of a closing wheel assembly 2000' illustrated in FIG. 14, a central axis Ab of the bushing 2012' intersects the plane Pf such that the forces F2, F4 act on the walking arm 2020' through the central axis Ab. Thus in the embodiment of FIG. 14, the forces F2, F4 preferably impose a very small or zero moment on the walking arm 2020' about the bushing 2012' as the row unit 10 traverses the field.

In some embodiments of the closing assembly, a flap 130 configured and disposed to return and firm soil into the trench 3 is preferably resiliently mounted to the pivot arm 150 by a spring 134 as described elsewhere herein.

In some embodiments of the closing assembly, the walking arm 2020 is biased into a horizontal position. In some such embodiments, a wrap spring is mounted to the bushing 2012 such that the wrap spring does not rotate with respect to the bushing 2012. The bushing 2012 is preferably press-fit into the bracket 2010. The wrap spring preferably contacts the walking arm 2020 at two points fore and aft of the bushing and imposes a counteracting moment on the walking arm 2020 which increases according to the effective spring constant of the wrap spring when the walking arm rotates in either direction from the horizontal position illustrated in FIGS. 11-12.

In alternative closing assembly embodiments, two closing wheels in the relative positions described herein with respect to the closing wheels 2032, 2034 are each rollingly mounted to a respective and independent closing wheel pivot arm which pivots freely from the either the subframe 14 or the pivot arm 150. In such embodiments, the closing wheel pivot arms are preferably biased (e.g., by springs) such that the closing wheels are each biased toward contact with the soil surface.

In the illustrated closing assembly embodiments, the forward closing wheel is illustrated to the left of the trench 3 and the rear closing wheel is illustrated to the right of the trench. However, in other embodiments the transverse position and orientation of the closing wheels could be reversed such that the forward closing wheel is positioned to the right of the trench 3 and the rear closing wheel is positioned to the left of the trench.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural row unit, comprising:
 a frame member supporting at least one opener disc disposed to open a trench in a soil surface as the agricultural row unit advances in a forward direction of travel;
 a pivot arm pivotally supported at a forward end from said frame member and rearward of said at least one opener disc, a rearward end of said pivot arm extending rearward of said frame member;
 a soil-engaging tool supported from said rearward end of said pivot arm, said soil-engaging tool disposed to engage a soil surface rearward of said at least one opener disc as the agricultural row unit advances in said forward direction of travel;

a first rotation sensor disposed to generate a first output signal relating to a continuous amount of rotation of said pivot arm relative to said frame member;

an actuator coupled to said pivot arm, said actuator configured to applying a down pressure on said soil-engaging tool; and a control system in signal communication with said first rotation sensor, said control system responsive to said first output signal to effect a change in applied down pressure on said soil-engaging tool by said actuator.

2. The agricultural row unit of claim 1, wherein said soil-engaging tool is a closing wheel.

3. The agricultural row unit of claim 1, wherein said soil-engaging tool is a resilient flap extending transverse to said forward direction of travel.

4. The agricultural row unit of claim 3, wherein said transversely extending flap includes wing sections angled forwardly toward said forward direction of travel.

5. The agricultural row unit of claim 1, wherein said actuator is a hydraulic actuator.

6. The agricultural row unit of claim 1, wherein said actuator is a pneumatic actuator.

7. The agricultural row unit of claim 1, wherein said actuator includes a down chamber and a lift chamber.

8. The agricultural row unit of claim 7, wherein said control system includes a first solenoid valve in fluid communication with said down chamber and a second solenoid valve in fluid communication with said lift chamber, each of said first and second solenoid valves in fluid communication with a fluid source, whereby said control system communicates signals to said first and second solenoid valves for controlling fluid to said down chamber and said lift chamber in response to said first output signal to effect said change in applied downward pressure on said soil-engaging tool by said actuator.

9. The agricultural row unit of claim 8, wherein said fluid source is a hydraulic fluid source and said actuator is a hydraulic actuator.

10. The agricultural row unit of claim 8, wherein said fluid source is an air source and said actuator is a pneumatic actuator.

11. The agricultural row unit of claim 1, further comprising:

a first gauge wheel arm pivotally supported at a first end from said frame member;

a first gauge wheel rotatably supported at a second end of said first gauge wheel arm, said first gauge wheel disposed to rollingly engage said soil surface as the agricultural row unit advances in said forward direction of travel;

a second sensor generating a second output signal relating to an orientation of said first gauge wheel arm relative to said frame member, said second sensor in signal communication with said control system;

wherein said control system is responsive to said first output signal and said second output signal to effect said change in applied down pressure on said soil-engaging tool by said actuator.

12. The agricultural row unit of claim 11, wherein said change in applied down pressure is based on a summed signal equal to a difference between said first output signal and said second output signal.

13. The agricultural row unit of claim 12, wherein said applied down pressure is increased when said summed signal exceeds a threshold.

14. The agricultural row unit of claim 13, where said threshold is based on said second output signal reflecting that said orientation of said first gauge wheel arm relative to said frame member has exceeded a predetermined orientation.

15. The agricultural row unit of claim 11, wherein said second sensor is a rotation sensor.

16. The agricultural row unit of claim 11, further comprising:

a second gauge wheel arm pivotally supported at a first end from said frame member;

a second gauge wheel rotatably supported at a second end of said second gauge wheel arm, said second gauge wheel disposed to rollingly engage said soil surface as the agricultural row unit advances in said forward direction of travel;

a third sensor generating a third output signal relating to an orientation of said second gauge wheel arm relative to said frame member, said third sensor in signal communication with said control system;

wherein said control system is responsive to said first output signal, said second output signal and said third output signal to effect said change in applied down pressure on said soil-engaging tool by said actuator.

17. The agricultural row unit of claim 16, wherein said change in applied down pressure is based on a summed signal equal to a difference between said first output signal and an average of said second output signal and said third output signal.

18. The agricultural row unit of claim 17, wherein said applied down pressure is increased when said summed signal exceeds a threshold.

19. The agricultural row unit of claim 18, where said threshold is based on said second and third output signals reflecting that said orientation of said first gauge wheel arm and said orientation of said second gauge wheel arm relative to said frame member has exceeded a predetermined average orientation.

20. An agricultural row unit, comprising:

a trench opening assembly including a frame member and at least one opener disc supported from said frame member, said at least one opener disc configured to open a trench in a soil surface into which seeds are deposited as the agricultural row unit advances in a forward direction of travel, said trench opening assembly further including a first gauge wheel arm pivotally supported at a first end from said frame member and further including a first gauge wheel rotatably supported at a second end of said first gauge wheel arm, said first gauge wheel disposed to rollingly engage said soil surface as the agricultural row unit advances in said forward direction of travel;

a pivot arm pivotally supported at a forward end from said frame member and rearward of said at least one opener disc, a rearward end of said pivot arm extending rearward of said frame member;

a soil-engaging tool supported from said rearward end of said pivot arm, said soil-engaging tool disposed to engage the soil surface rearward of said at least one opener disc;

a first rotation sensor disposed to generate a first output signal relating to a continuous amount of rotation of said pivot arm relative to said frame member;

an actuator coupled to said pivot arm, said actuator configured to applying a down pressure on said soil-engaging tool; and a control system in signal communication with said first rotation sensor, said control system responsive to said first output signal to effect a change in applied down pressure on said soil-engaging tool by said actuator.

21. The agricultural row unit of claim 20, wherein said soil-engaging tool is a closing wheel.

22. The agricultural row unit of claim 20, wherein said soil-engaging tool is a resilient flap extending transverse to said forward direction of travel.

23. The agricultural row unit of claim 22, wherein said transversely extending flap includes wing sections angled forwardly toward said forward direction of travel.

24. The agricultural row unit of claim 20, wherein said actuator is a hydraulic actuator.

25. The agricultural row unit of claim 20, wherein said actuator is a pneumatic actuator.

26. The agricultural row unit of claim 20, wherein said actuator includes a down chamber and a lift chamber.

27. The agricultural row unit of claim 26, wherein said control system includes a first solenoid valve in fluid communication with said down chamber and a second solenoid valve in fluid communication with said lift chamber, each of said first and second solenoid valves in fluid communication with a fluid source, whereby said control system communicates signals to said first and second solenoid valves for controlling fluid to said down chamber and said lift chamber in response to said first output signal to effect said change in applied downward pressure on said soil-engaging tool by said actuator.

28. The agricultural row unit of claim 27, wherein said fluid source is a hydraulic fluid source and said actuator is a hydraulic actuator.

29. The agricultural row unit of claim 27, wherein said fluid source is an air source and said actuator is a pneumatic actuator.

30. The agricultural row unit of claim 20, further comprising:
a second sensor generating a second output signal relating to an orientation of said first gauge wheel arm relative to said frame member, said second sensor in signal communication with said control system;
wherein said control system is responsive to said first output signal and said second output signal to effect said change in applied down pressure on said soil-engaging tool by said actuator.

31. The agricultural row unit of claim 30, wherein said change in applied down pressure is based on a summed signal equal to a difference between said first output signal and said second output signal.

32. The agricultural row unit of claim 31, wherein said applied down pressure is increased when said summed signal exceeds a threshold.

33. The agricultural row unit of claim 32, where said threshold is based on said second output signal reflecting that said orientation of said first gauge wheel arm relative to said frame member has exceeded a predetermined orientation.

34. The agricultural row unit of claim 30, wherein said second sensor is a rotation sensor.

35. The agricultural row unit of claim 30, further comprising:
a second gauge wheel arm pivotally supported at a first end from said frame member;
a second gauge wheel rotatably supported at a second end of said second gauge wheel arm, said second gauge wheel disposed to rollingly engage said soil surface as the agricultural row unit advances in said forward direction of travel;
a third sensor generating a third output signal relating to an orientation of said second gauge wheel arm relative to said frame member, said third sensor in signal communication with said control system;
wherein said control system is responsive to said first output signal, said second output signal and said third output signal to effect said change in applied down pressure on said soil-engaging tool by said actuator.

36. The agricultural row unit of claim 35, wherein said change in applied down pressure is based on a summed signal equal to a difference between said first output signal and an average of said second output signal and said third output signal.

37. The agricultural row unit of claim 36, wherein said applied down pressure is increased when said summed signal exceeds a threshold.

38. The agricultural row unit of claim 37, where said threshold is based on said second and third output signals reflecting that said orientation of said first gauge wheel arm and said orientation of said second gauge wheel arm relative to said frame member has exceeded a predetermined average orientation.

* * * * *